May 15, 1945.                 M. M. DE CASTRO                 2,376,235
                           LIGHT SENSITIVE APPARATUS
                         Filed Dec. 10, 1942          7 Sheets-Sheet 1
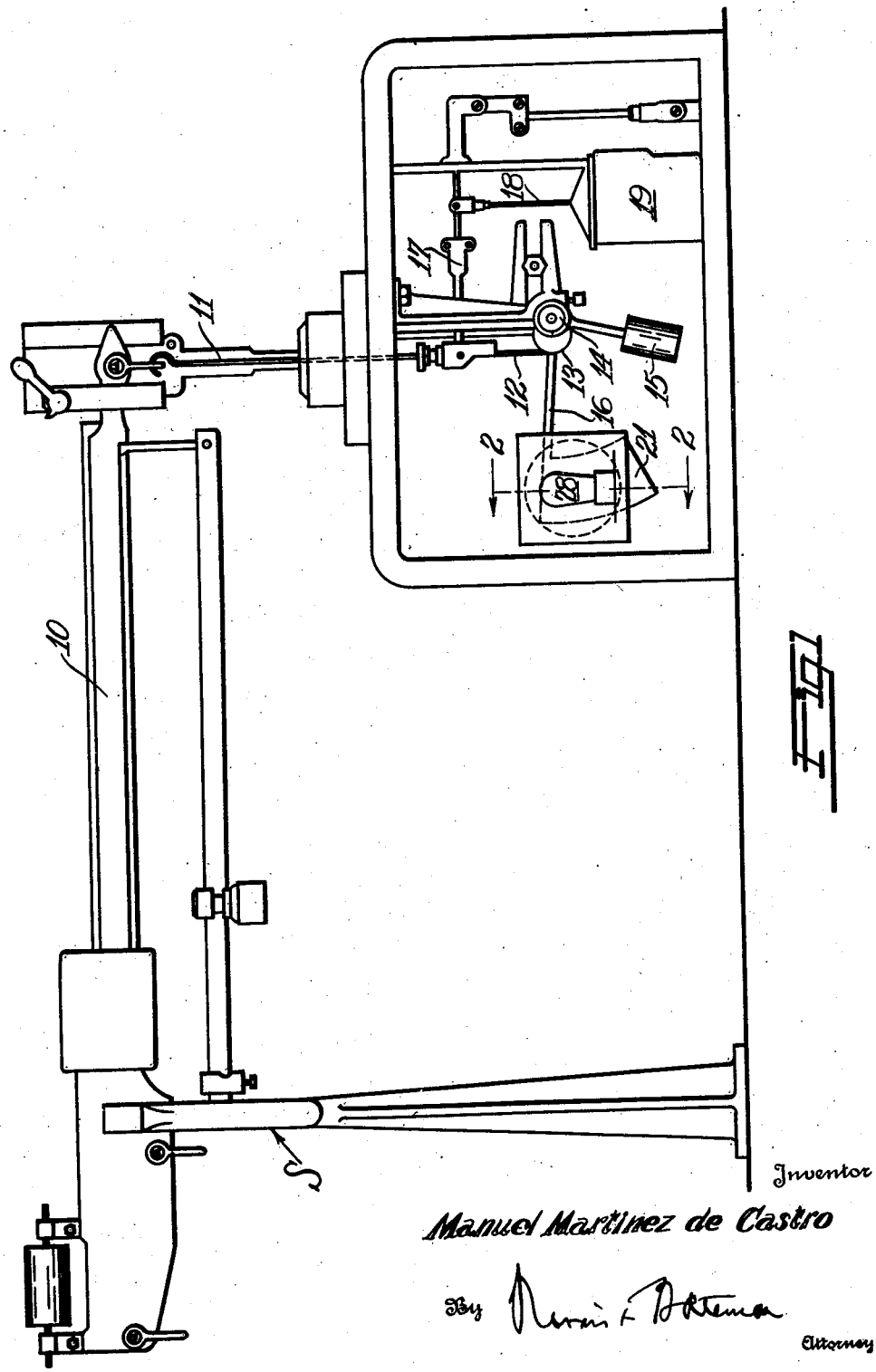
FIG. 1.
Inventor
Manuel Martinez de Castro
Attorneys

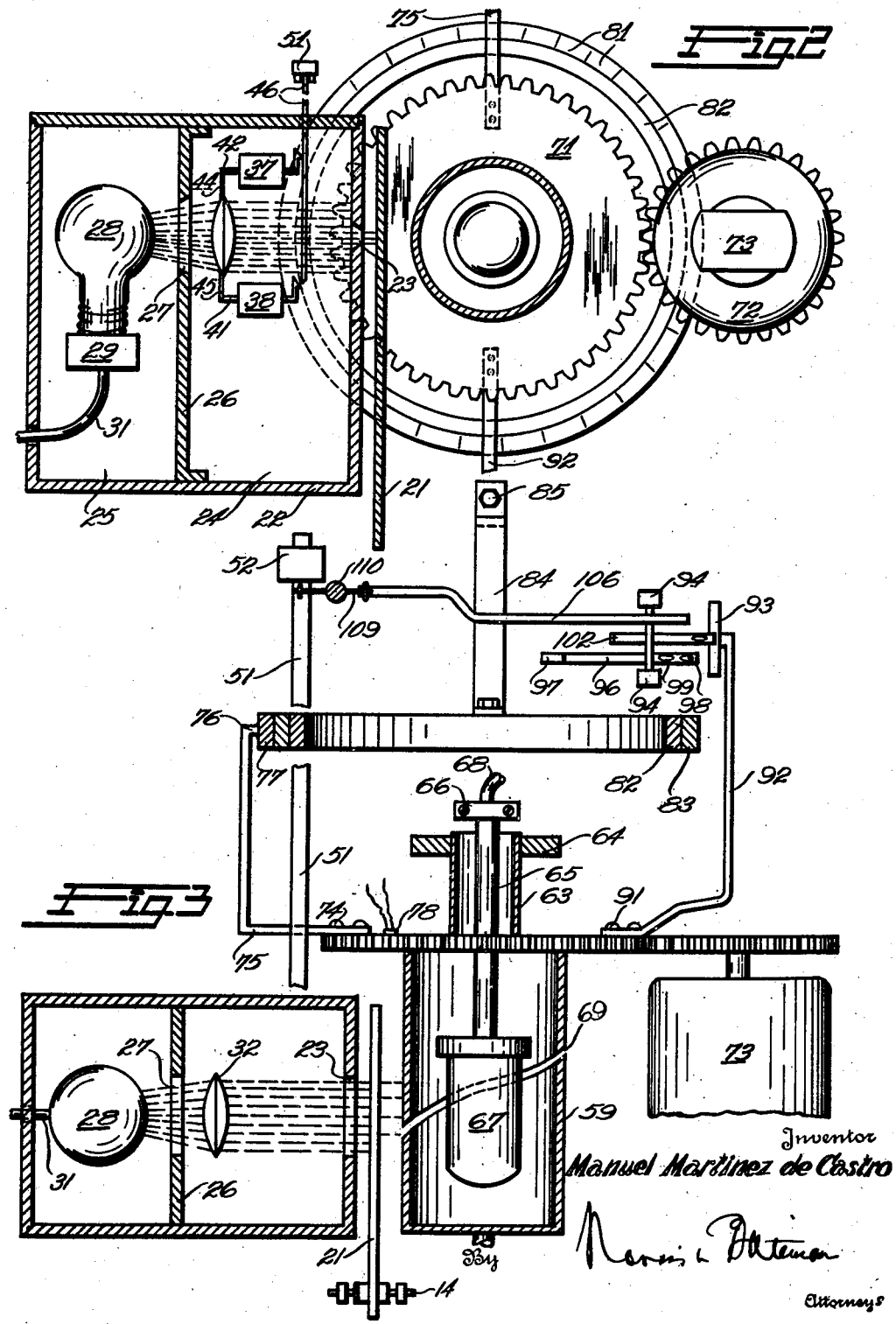

May 15, 1945. M. M. DE CASTRO 2,376,235
LIGHT SENSITIVE APPARATUS
Filed Dec. 10, 1942 7 Sheets-Sheet 3
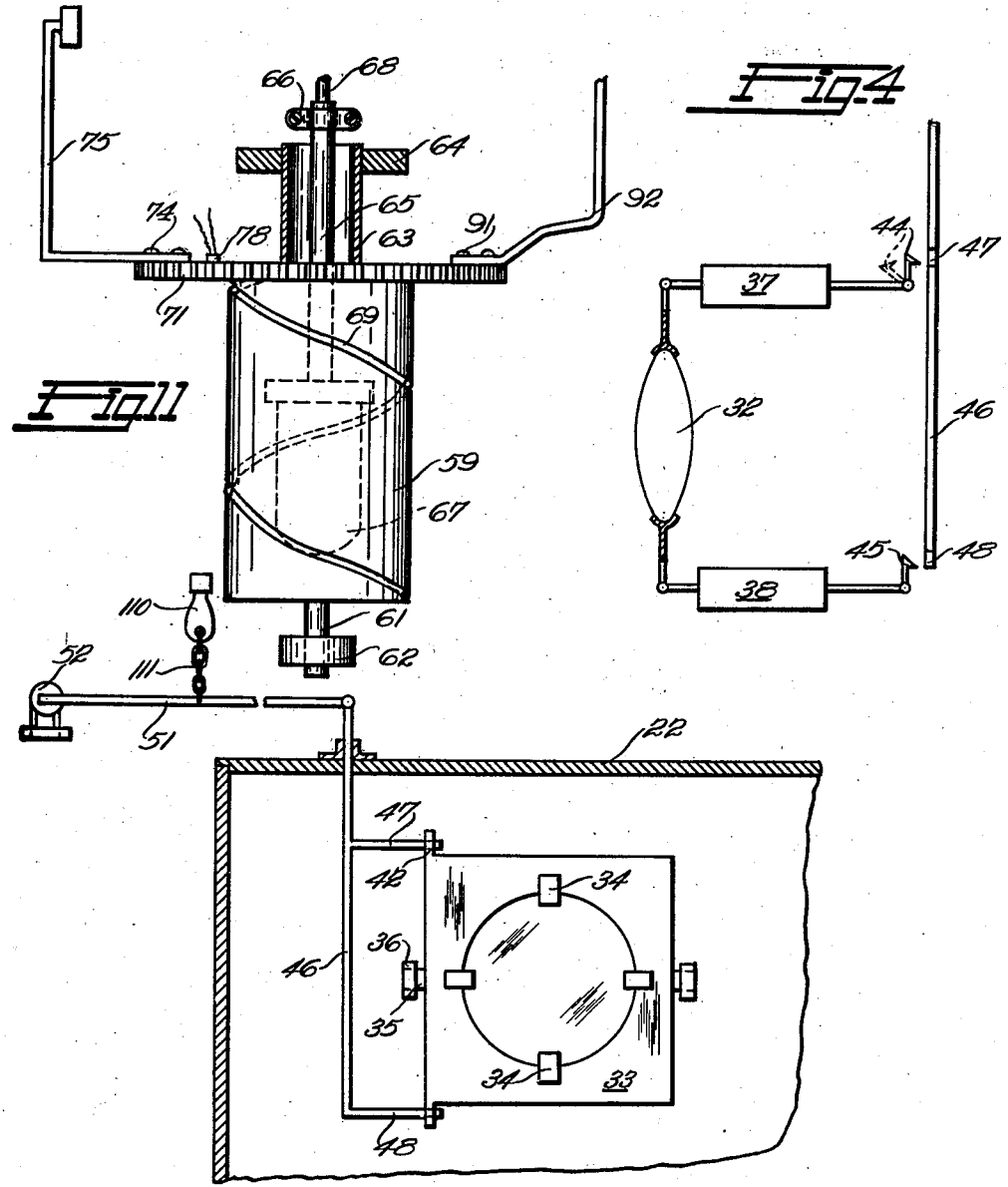
Inventor
Manuel Martinez de Castro
By
Attorneys May 15, 1945.  M. M. DE CASTRO  2,376,235
LIGHT SENSITIVE APPARATUS
Filed Dec. 10, 1942  7 Sheets-Sheet 4
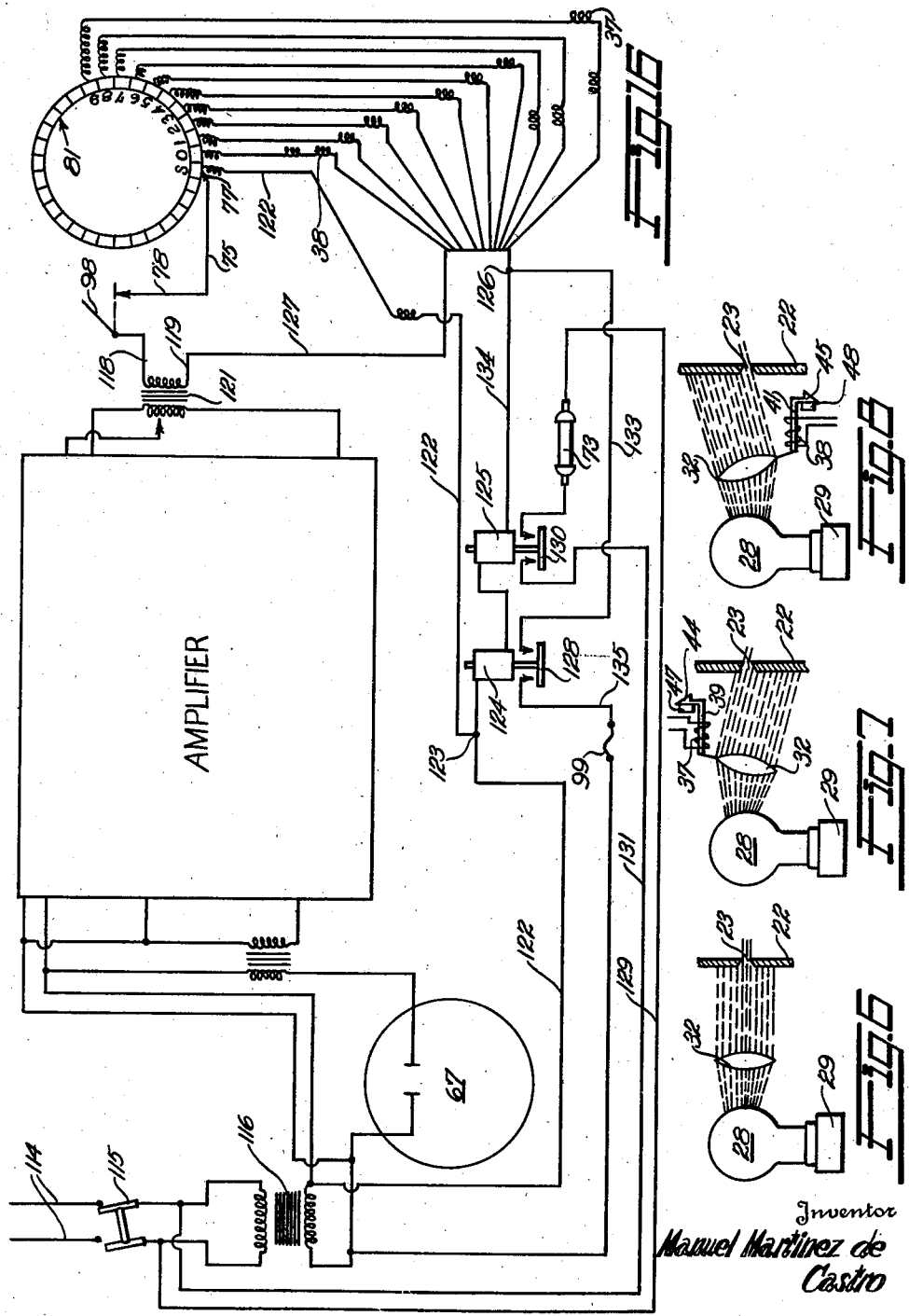
Inventor
Manuel Martinez de Castro
By Morris L. Bateman
Attorneys

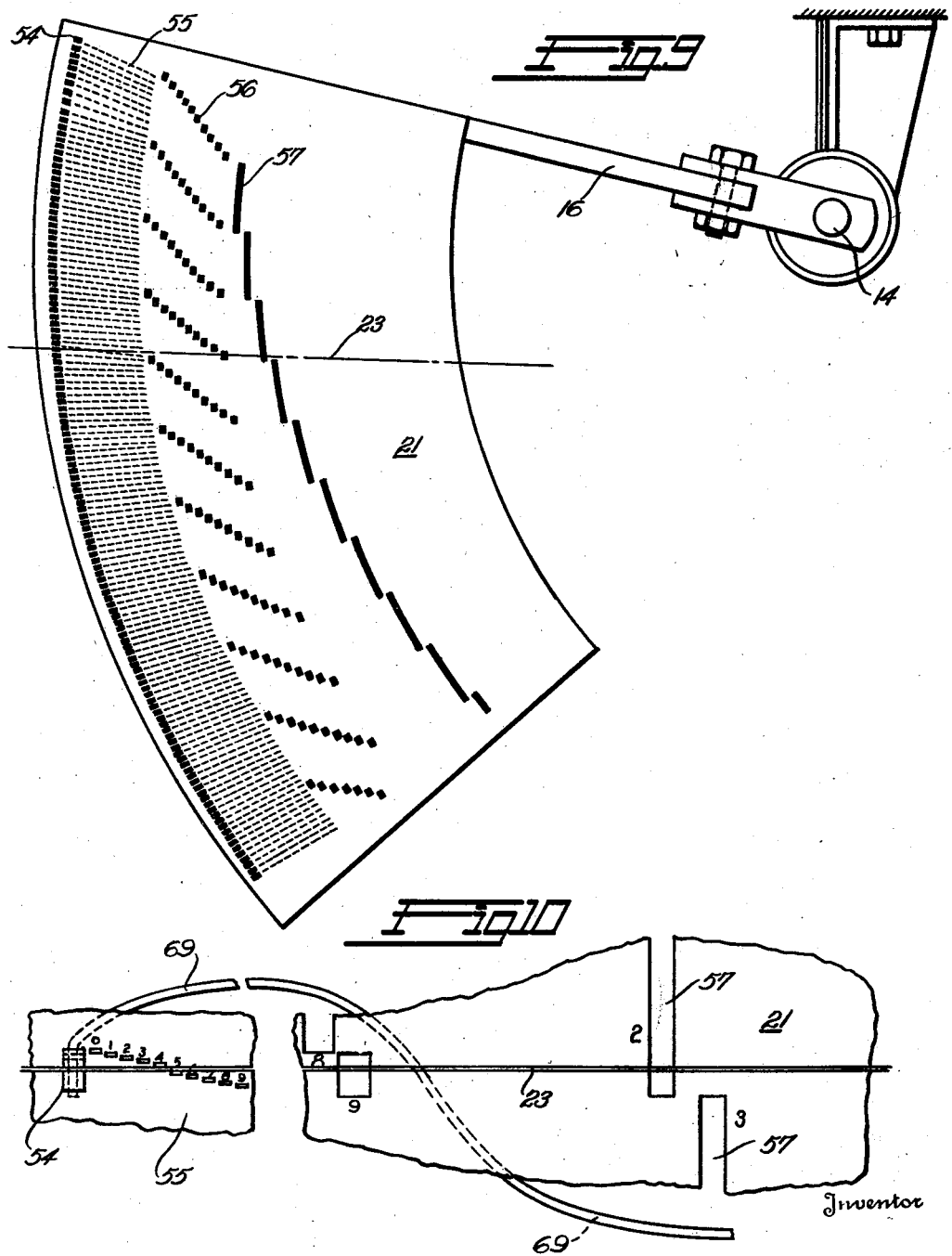

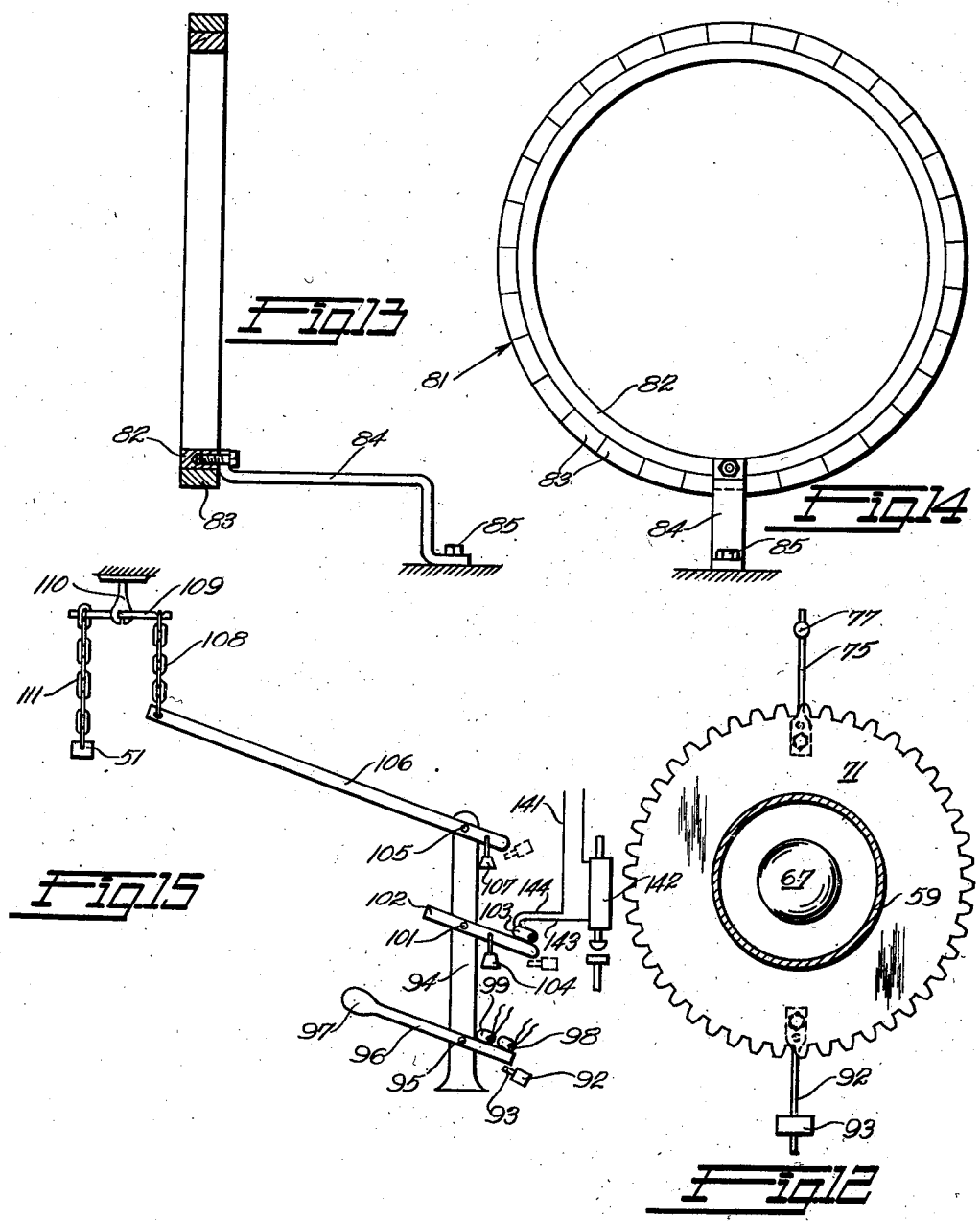

May 15, 1945.　　　M. M. DE CASTRO　　　2,376,235
LIGHT SENSITIVE APPARATUS
Filed Dec. 10, 1942　　　7 Sheets-Sheet 7
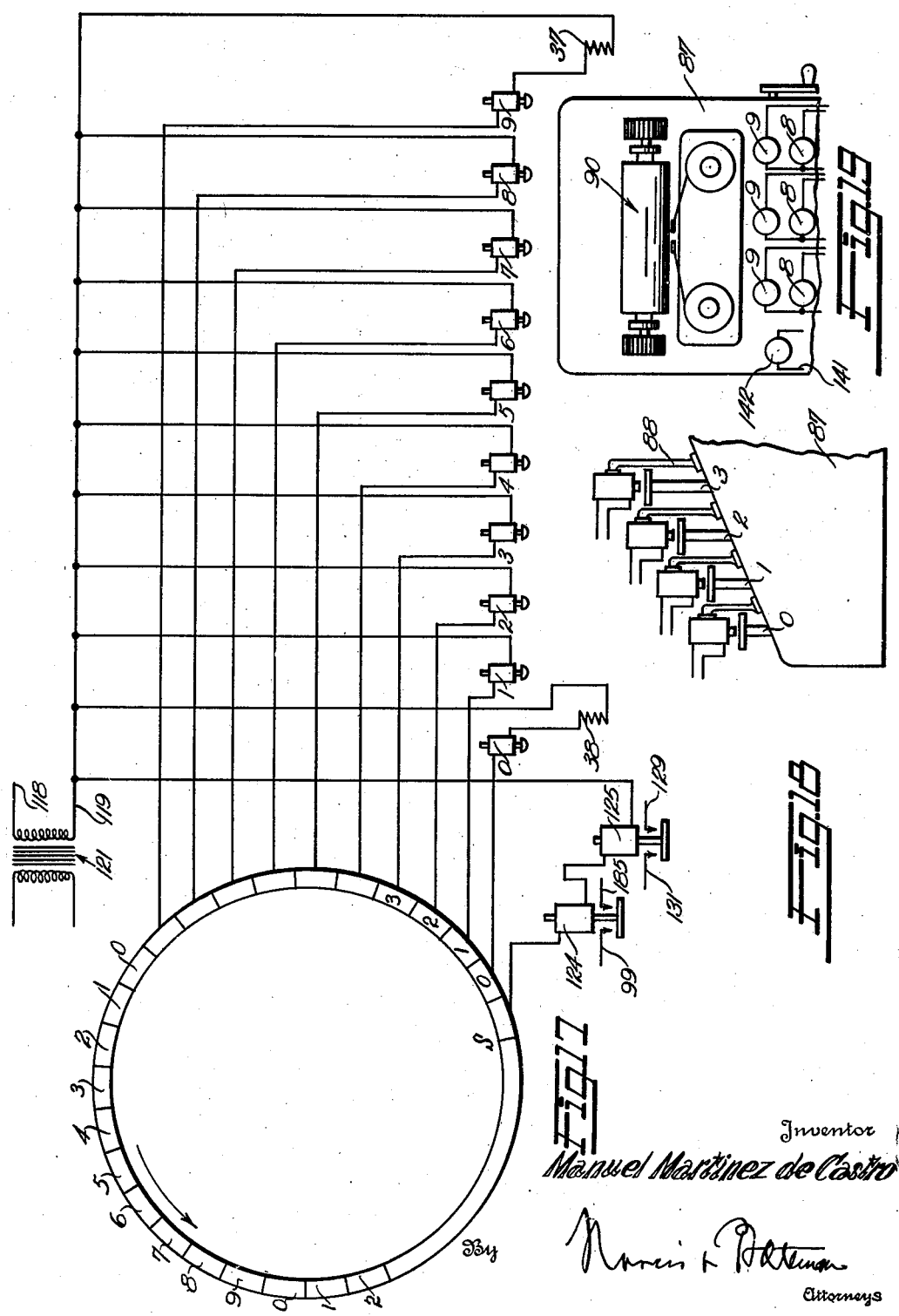
Inventor
Manuel Martinez de Castro
By
Attorneys

Patented May 15, 1945

2,376,235

UNITED STATES PATENT OFFICE 2,376,235

LIGHT SENSITIVE APPARATUS

Manuel Martínez de Castro, San Francisco, Calif.

Application December 10, 1942, Serial No. 468,567

23 Claims. (Cl. 250—41.5)

The present invention relates to registering or recording apparatus, and more particularly to an attachment for weighing machines for registering or recording the weights of the different weighings thereof.

In my co-pending application, Serial No. 379,364, filed February 17, 1941, for Registering device for weighing apparatus, I have disclosed an apparatus of this general character and one which represents a substantial improvement over the apparatus heretofore proposed, and it is the major object of this invention to provide a novel apparatus having all the advantages of that apparatus and further advantages to be hereafter pointed out.

It is the primary object to provide a weighing mechanism with a novel recording or registering apparatus, which will accurately register the weight indicated by the weighing mechanism and is not subject to fluctuations of the weighing mechanism, and yet is of simple, rugged design and having a minimum of adjustments that must be carried out to keep it in proper working order.

A further important object is to provide a weighing mechanism having a device for successively projecting, upon a single photoelectric cell, rays of light of successively higher denomination, denoting units, tens, hundreds, etc., of the weight, and providing means for causing the successive impulses set up in the cell to record or register the weight.

A further object is to provide a weighing mechanism with a light-transmitting screen and a scanning shutter, the screen being movable in accordance with the weighing movements in front of a light source, and the shutter being movable to successively project the light rays passing through the screen upon a photoelectric cell, together with means for causing the impulses received by the cell to register the weight.

Another object is to provide a light-transmitting screen rockable in front of a window through which light rays are passed, with a rockable lens and a photoelectric cell means, operable in accordance with the movements of the weighing mechanism, to record the weights, and also operable, in the event that the portions of the screen bearing the "nine" units and "one" units come opposite the window, the lens will be automatically tilted in the proper direction to prevent the transmission of light rays to the cell which would introduce error in the recorded weight.

Further objects will become apparent as the specification proceeds in conjunction with the annexed drawings, and from the appended claims.

In the drawings:

Figure 1 is a front elevational view showing the invention embodied in a beam type weighing mechanism;

Figure 2 is a vertical sectional view taken substantially on the line 2—2 of Figure 1;

Figure 3 is a top plan view, with parts in section, of the apparatus shown in Figure 2, certain of the parts being illustrated diagrammatically to simplify the disclosure;

Figure 4 is a view illustrating the mechanism employed for tilting the lens and for latching it in tilted position until the end of the particular weighing cycle;

Figure 5 is a view of the apparatus of Figure 4, as it appears when viewed from the left-hand side of that figure;

Figure 6 is a diagrammatic view showing the manner in which the light rays are normally projected by the lens through the transmitting screen;

Figure 7 is a view similar to Figure 6, but shows the lens tilted into the position it assumes when digit "0" is registered;

Figure 8 is a view similar to Figure 6, but shows the lens in the tilted position it assumes when digit "9" is registered;

Figure 9 is a front elevational view of the light transmitting screen or windowed member;

Figure 10 is a fragmental view of the screen on a greatly enlarged scale, showing the manner in which the windows opposite the light-transmitting slit are successively scanned by the shutter groove, the latter being indicated by broken lines;

Figure 11 is a top plan view of the scanning shutter and the associated parts which are rotated synchronously therewith;

Figure 12 is a transverse sectional view through the shutter of Figure 11;

Figures 13 and 14 are side and front elevations, respectively, of the stationary commutator, showing the manner in which it is supported;

Figure 15 is a side elevation of the series of cycle-controlling elements which are successively tripped near the end of the weighing cycle, and which are also shown in top plan view in Figure 3;

Figure 16 is a diagrammatic illustration of the electrical circuit employed in my apparatus;

Figure 17 is a diagrammatic illustration of the detailed electrical circuit from the commutator segments to the key-actuating solenoids;

Figure 18 is a side elevational view showing the manner in which the solenoids are associated with a conventional adding machine of the printing type; and Figure 19 is a fragmentary top plan view of the structure shown in Fig. 18, illustrating the printing mechanism.

With continued reference to the drawings, in which like reference characters have been used to designate similar parts throughout the several views thereof, the invention is shown applied to a beam scale S, having a weighing beam 10. Pivotally connected to beam 10 is a connecting rod 11 carrying a steel tape 12 at the lower end. Tape 12 passes around an eccentric 13 carried on a shaft 14, which also rigidly supports a pendulum 15, and a stem 16. Also actuated by connecting rod 11, through a linkage 17 and 18 is a dashpot 19, for damping out vibrations, in well known manner.

The actual weighing and printing is effected by a screen or sector 21 carried by stem 16 coacting with an associated photoelectric cell and circuit assembly, to be hereinafter described.

Referring more particularly to Figures 2 and 3, sector 21 rocks in close proximity to a box 22, having a narrow slit 23, through which light rays are thrown upon the sector or screen. The box is divided into a front chamber 24 and a rear chamber 25 by a partition 26, having a light-passing aperture 27.

Any suitable source of light, for instance, an electric lamp 28 carried by a base 29 and having a lead 31 connecting it to a power line, is mounted in chamber 25 and is adapted to project light rays through a lens or condenser 32, from which they emerge as parallel rays and pass through slit 23 and are received upon screen 21.

Lens 32 is mounted in an opening in a panel or frame 33 and secured in place by means of several clips 34 or the like. Frame 33 is mounted for limited rocking movement about a horizontal axis by means of trunnions 35 journaled in brackets 36 supported in chamber 24 in any suitable manner, so that the lens may be shifted from the position it normally assumes by gravity (Figures 4 and 6) into the tilted positions shown in Figures 7 and 8, for a purpose that will presently appear. The frame is adapted to be automatically tilted during the weighing operation by means of solenoids 37 and 38, secured in chamber 24 in any suitable manner, and having cores 39 and 41, respectively, pivotally connected to arms 42 and 43 provided on frame 33.

Pivoted on the free ends of cores 39 and 41, and urged toward the vertical position shown in Figure 6 by resilient means are detents or catches 44 and 45. Coacting with the catches is a bar 46 carrying abutments 47 and 48 adapted to cooperate with catches 44 and 45, respectively, and hold the lens in tilted position until bar 46 is tripped, as will be hereinafter described. Bar 46 is mounted for vertical movement in a guideway 49 carried by the top of box 22, and is pivotally connected to one end of a lever 51, which is journaled for limited rocking movement on a support 52.

Assuming that the parts are in the positions shown in Figures 2 and 4, with lens 32 vertical, and solenoid 37 is momentarily energized (when the digit "0" is printed, as described later) core 39 is pulled to the right, tilting the lens clockwise into the position shown in Figure 7, thereby causing the rays to be directed downwardly through slit 27. When this occurs catch 44 tips and resiliently under passes abutment 47 on bar 46 and goes into the latched position shown in Figure 7, thereby preventing the lens to return to normal position by gravity when the solenoid circuit is broken. When bar 46 is pulled up by lever 51, abutment 47 is moved out of the path of catch 44, permitting the lens to return to normal position, carrying with it core 39 and catch 44 with it. Bar 46 is automatically lifted at the end of the recording cycle in a manner to be hereinafter pointed out. The reverse tilting of the lens occurs when solenoid 38 is energized, catch 45 holding the parts until the cycle is completed and bar 46 lifted.

The screen or sector 21, and the manner in which the light rays pass through it and are scanned by the rotating shutter, will now be described.

The screen is made of blackened glass, sheet metal, or the like and is provided with a plurality of groups of openings or windows graduated in the direction of movement and spaced apart transversely to the direction of movement, as seen in Figure 9.

The first row of openings, 54, permit the passage of light from slot 23 through the sector no matter what position the latter may assume during balancing. These windows serve to start the machine at the beginning of the cycle, and are so dimensioned that when the sector is balancing up and down, insufficient light will pass through to start the machine until the sector is brought substantially to rest by the dashpot at balance.

The next row of openings, 55, is a series of groups of "unit" windows, with ten windows in each row, each window being a little above the preceding one. The last or tenth window of each series is located just slightly above the next one of the following series below. The first window corresponds to digit "0", the second window to digit "1"; the third to digit "2," and the tenth window to digit "9." The window arrangement is repeated a plurality of times until the last window of the last series corresponds to digit "9."

The third row of openings, 56, is made up of groups of "tens" windows, the top window of each row representing "0," the next "1," and so forth to "9." The height of each window of row 56 is exactly equal to the combined heights of the corresponding row 55, there being one "tens" window for each group of "units" windows.

The fourth row of openings, 57, is made up of "hundreds" windows, and they are so arranged that there is one window for each group of "tens" windows, and each is so dimensioned as to have a height exactly equal to the combined heights of the "tens" windows. It is to be understood that if it is desired to record four or five digit figures, the sector may be provided with additional rows of windows, one for each additional figure desired.

Slot 23 in box 22 is long enough to allow light to be projected through any of the windows in segment 21 that may be opposite the slot at balance, and has a width no greater than one of the windows of row 55, so that light rays can only be projected through a single window at a time.

Summarizing the operation of the structure so far described, when a load is placed upon the scale, sector 21 comes to a balancing position and a thin band of light is projected thereon through window 23. As seen more clearly in Fig. 10, the light will go through a window of row 54; a window of row 55 (shown as window 4); a window of row 56 (shown as window 9); and a window of row 57 (shown as the "two" window), the apparatus being set up to record "294." Accordingly, only four small shafts or rays of light will be projected through the screen.

The novel apparatus for scanning the four rays of light passing through the sector, and causing the indicated weight to be recorded, will now be described.

Referring more particularly to Figures 2, 3 and 11, mounted for rotation adjacent the rear face of sector 21 is a cylindrical shutter 59 closed at one end and having a shaft 61 journaled in a bearing 62 supported in any suitable manner. The other end of the shutter is provided with an enlarged sleeve portion 63, journaled in a second bearing 64. Extending into the open end of the shutter is a lamp support 65 supported by a bracket 66 and carrying a photoelectric cell 67, the lamp being supplied with current through wires 68 passing through support 65.

Shutter 59 is provided with a comparatively narrow helical slot 69, the slot and photoelectric cell being of such length that upon one full revolution of the shutter, the four rays of light passing through the sector windows will be successively projected upon the cell, the units first, the tens next and then the hundreds. The impulses thus received by the cell, in combination with the novel commutator and circuit to now be described, effect recording of the weight in the manner to be later set forth.

Secured to the open end of the shutter 59, in any suitable manner, is a spur gear 71, meshing with a spur pinion 72 of a motor 73. If desired, a further speed reduction may be built directly into the motor.

Secured to gear 71, by means of rivets 74 or the like, is an outwardly extending arm 75, which is curved back on itself to provide an inwardly directed brush support 76 carrying a brush 77. Current is supplied to brush 77 through arm 75 by means of a stationary brush 78, which bears directly against one face of gear 71. If desired, however, arm 75 may be insulated from gear 71 and current may be fed thereto by having brush 78 coact with a separate insulated collector ring.

Referring to Figures 3, 13 and 14, brush 77 coacts with a stationary commutator 81 made up of a ring 82 and a plurality of segments 83, which are insulated from each other and from the ring. The commutator is carried by a support 84, which is offset to clear the other elements during rotation of the shutter-collector assembly, and is secured by means of a cap screw 85 to any suitable stationary part of the apparatus. In the illustrated example of the invention, there are thirty-one segments, one each for the "units" from zero to nine, one each for the "tens" from zero to nine, and one each for the "hundreds" from zero to nine, plus an additional segment, designated "S" in the drawings, and which is the start and stop segment. In machines having thousands or hundred thousands or more figures, it is evident that ten more segments are necessary for each additional decimal desired.

Each commutator segment has a wire leading to a solenoid located over the appropriate key of a printing type conventional adding machine, so that when a current flows through the solenoid the appropriate keys will be depressed in the same manner as manually, setting up the number to be printed or a series of numbers in successive weighings for totalizing. As shown in Figure 17, the "unit" commutator segments are connected to solenoids located over the unit row of keys in the adding machine. Similarly, the next group of segments (reading in a counterclockwise direction in Figure 17), are connected to solenoids (not shown) located over the tens row of keys, and the hundreds segments are connected to solenoids located over the "hundreds" row of keys.

As shown in Figures 18 and 19, the unit solenoids are supported in operative position over the unit keys 0, 1, 2, 3 of machine 87 by means of brackets 88, so that the key may be depressed electromagnetically in much the same manner as when depressed manually. The usual printing assembly 90 and printer actuating keys are provided in well known manner.

With continued reference to Figure 17, it is seen that the first segment above the starter segment "S" is unit "0," and that solenoid 38 is located in series with the solenoid associated with the zero key of the unit row, so that whenever the zero solenoid is energized, solenoid 38 will also be energized and tilt lens 32 into the tilted position shown in Figure 8. Similarly, solenoid 37 is in series with the solenoid for the "nine" key of the unit row and is adapted to simultaneously tilt the lens into the oppositely tilted position shown in Figure 7 upon closing the circuit through segment "nine." The purpose of the novel lens tilting assembly is to eliminate inaccuracies that were heretofore present in machines of this character, as will be hereinafter pointed out.

If, instead of the full key board type machine shown, it is desired to apply the invention to machines of the simple ten-key type, then only ten solenoids will be required, one over each key, and all of the corresponding segments of the commutator will be electrically connected, i. e., all the "zeros," "ones," "twos," etc., will be joined. However, since this type machine prints first the hundreds, then the tens and finally the units, it will be necessary to slightly modify the machine to reverse the order of printing, or to reverse the order of scanning of the light rays projected through the screen by the shutter, either alternative producing a successfully operating machine. With the foregoing explanation of the alternative form of the machine, the following description of the balance of the structure and operation is based upon the full key board exemplification illustrated in the drawings.

The novel means for starting and stopping the apparatus, and for also restoring the lens to normal position, will now be described. Referring first to Figure 12, secured to gear 71, by means of rivets 91, is an arm 92, located 180° from arm 75, and carrying a trip member 93 at its free end, which successively coacts with a group of levers, seen more clearly in Figure 15. A stand made up of upright members 94 is secured to any stationary part of the machine and supports a series of levers.

Mounted on a shaft 95 in supports 94 is a lever 96, which terminates at one end in a handle 97 and at the other in two mercury switches 98 and 99. The lever is so balanced, and has sufficient friction at its fulcrum so that it will remain in any given position, with the switches either open or closed. If desired, any other type of switch that will open and close upon tilting a lever may be used.

Mounted on a second shaft 101 is a lever 102 having a mercury switch 103 at its free end and is provided with a counterweight 104 for normally holding the lever down so as to keep the switch in the "off" position.

A third shaft 105 carries a long lever 106, weighted at 107, so as to normally be maintained in the position shown in Figure 15. Connected to the free end of lever 106, by means of a chain 108, is one end of a short lever 109 fulcrumed on a supporting bracket 111. Connected to the other end of lever 109, by means of a chain 112, is the intermediate portion of lever 51, seen more clearly in Figure 5. Therefore, when lever 106 is rocked counterclockwise by the tripper 93, chain 108 will rock lever 109 clockwise, and through chain 112 will lift lever 51 and move abutments 47 and 48 out of the path of catches 44 and 45, permitting the lens to return to normal position. If desired, the lens frame may be provided with a pendulum or like mass to augment the tendency for the lens to return to normal position under the influence of gravity.

As indicated in Figure 15, the right-hand ends of levers 96, 102, and 106 are located in the arc of travel of the tripper 93, so that with the tripper traveling in the direction indicated, the levers will be successively tripped in the order named toward the end of the cycle.

Referring now to the circuit diagram of Figure 16, the power mains delivering the proper voltage are designated as 114, and a general entrance switch 115 is placed in the lines controlling current flow to a transformer 116. When the switch is closed, the electric eye 67 and its power amplifying circuit 117 is warmed up. The power amplifying circuit has not been shown in detail, since any number of various circuits might be used for increasing the current variations of the electric eye up to the point where the increased current is delivered at the terminals 118 and 119 of a transformer 121. For instance, the power amplifying circuit may be the same as the circuits 105 of my copending application, it being noted, however, that only one single electric eye and but one power amplifying circuit are required, thereby achieving material simplification of the apparatus disclosed in that application.

Taking up a complete cycle of operation of the apparatus, and assuming that a load has been placed upon the scale and brought to balance, the motor has stopped during the preceding cycle to locate shutter 59 in the angular position shown in Figure 10, with the end of 69 in a position to allow light passing through one of the openings of row 54 to strike the electric eye, and brush 77 is arranged to, at this instant, contact segment "S," as indicated in Figure 16. This is the starting position of the parts, and the condition to which they are returned at the end of each cycle.

With the parts in the starting position just described, the electric eye receives a ray of light and through the amplifier circuit immediately produces a high potential at terminals 118 and 119. However, nothing further happens because switch 98 (Figure 15) is open, due to lever 96 being down. If the operator now desires to record the weights, handle 97 is pulled up to close switches 98 and 99. There is now a closed circuit from terminal 118 to switch 86 to brush 78 to gear 71 and brush 77 through segment "S" of commutator 81, and thence through a wire 122 to a junction 123, then to a solenoid switch 124 and a solenoid switch 125 (in series), then to a junction 126 and through a return wire 127 to transformer terminal 119, thereby closing a circuit through the transformer and through contacts 128 and 130 of solenoid switches 124 and 125, closing a circuit through motor 73 by way of power lines 129 and 131.

Motor 73, accordingly, starts shutter 59 to rotating, carrying with it arms 75 and 92. As soon as the shutter starts to rotate, its helical groove moves away from opening 54, shutting off the light ray. At this moment the electric eye, having its light cut off, diminishes its output at transformer 121, and there will be no more current at solenoids 124 and 125 and if their contacts should drop motor 73 would also stop. Since it is essential to keep the motor running for a full revolution of brush 77 and shutter 59, to scan and print the weighings, solenoid 124 is utilized to hold the circuit closed. As seen in Figure 16, contact 128 of solenoid 124, through lines 133 and 134 is connected to solenoids 125 and 124, and then through wire 122 to one terminal of transformer 116. The other end of contact 128 through a wire 135, switch 99 to the other terminal of transformer 116, completes the circuit.

The solenoid switch assembly, accordingly, keeps motor 73 running so long as switch 99 is closed, irrespective of whether or not transformer 121 has power output.

Taking up the scanning by the shutter of the light rays passing through the openings in the screen that have been brought into registry with the narrow slit 23, motor 73 continues to rotate the shutter, and, referring to Figure 10, it is apparent that when shutter slot 69 passes in front of the zero unit row there is no light ray passing through, so the electric eye remains unenergized and the shutter continues to rotate, it being understood that the parts are so designed that brush 77 at this moment is passing over the zero "unit" segment of the commutator. However, when the shutter brings its groove in front of the four window of the unit row, it allows the ray of light to be projected upon the electric eye and the latter delivers current at the transformer terminals, brush 77 at this instant passing over the "four" segment of the commutator. A current is, accordingly, promptly built up in the terminals of transformer, and a current flows from terminal 118 through switch 98, brushes 78 and 77, segment 4 and through the solenoid over the "four" key of the "units" row, thereby depressing the key, the current flowing through wire 127 back to terminal 119.

In similar manner, as the shutter continues to rotate the rays of light passing through the "nine" window in the tens row and the "two" window in the hundreds row are projected through slot 23 onto the photoelectric cell, energizing the transformer and sending current through the respective solenoids to depress the proper keys on the adding machine to set up the proper weight.

Assuming now that the shutter has scanned all the light rays and has substantially completed a revolution, arm 92, rotatable in unison therewith brings tripper 93 into the full line position, shown in Figure 15, just about to contact lever 96. As soon as tripper engages and pushes lever 96 up switches 98 and 99 are tripped and opened, thereby opening the circuits of solenoids 124 and 125, and, as soon as solenoid opens contact 128, the power supply to motor 73 is interrupted and the motor starts to "coast." The coasting of the motor is utilized to perform certain operations at the end of the cycle, as follows:

After tripper passes lever 96, it strikes lever 102, lifting it and closing switch 103. Switch 103 is connected to a power source 141 and a solenoid 142 by means of wires 143 and 144. This solenoid may be employed to automatically depress the printing key of the machine at a predetermined time at the end of each cycle, as indicated in Fig. 19. In the case of non-electric adding machines, the lever can be operated manually, or, if desired, a stronger solenoid may be substituted so as to actuate the handle and obviate the manual operation.

Assuming that tripper 93 passes lever 102, the motor continues to coast a further distance sufficient to bring the tripper into engagement with lever 106, and lift it against the action of weight 107 so as to pull chains 108 and 111, lifting bar 46 into lens-releasing position. However, during the weight recording operation just described, the lens was not tilted but remained in the position of Figure 6 throughout. Therefore, the lifting of bar was merely an idle stroke under the circumstances.

After the tripper has passed all three levers, the motor finally stops with brush 77 on "stop and start" segment "S" of the commutator, and, if desired, additional means may be employed to assure stoppage of the parts in this relationship. For instance, an electromagnetically actuated brake may, if desired, be used to positively stop the motor at the proper position. The apparatus is now ready for a new weighing operation.

Since lever 96 remained in the position into which it was moved by tripper 93, switches 98 and 99 will remain open and the apparatus will not again print until handle 97 is pushed up into the position shown in Figure 15. Levers 104 and 106, however, both being weighted, returned immediately to their original positions upon passage of tripper 93, so they automatically prepare themselves for a further weighing cycle.

The purpose of the tilting or focussing lens, which remained in non-tilting position during the weighing operation previously described because the openings in the screen that came opposite the slit did not call it into play, will now be set forth.

Referring to Figure 10, it is noted that the window openings are, and must necessarily be, quite close to each other, and it has been found that in apparatus of this general character it is possible for the machine to print great errors unless the novel lens tilting means of the present invention is employed.

While the sector is supposed to remain stationary at balance, instances may develop where there is some vibration. Then again the load will not always be a perfectly round figure such as 499 pounds, and if the scale only registers "even" pounds, it is obvious that if a load of 499½ pounds is placed on the scale the beam would oscillate indistinctly between 499 and 500 pounds. Therefore, insofar as the printer is concerned, it would be just as accurate to print either 499 or 500 pounds.

Assuming that the correct number to print is 499 pounds, and the machine starts correctly scanning and printing the unit 9 (row 55 of the sector). However, since the "nine" and "ten" windows of the tens row 56 are so close any small deviation of the machine or any vibration of the sector during scanning, there is a possibility that when the shutter scans the tens row instead of picking up the correct "9," it might pick up the closely adjacent "0." Again, in going through the hundreds, it might develop that the shutter would correctly scan the "4" or incorrectly scan the "5." Accordingly, unless some means were provided to prevent it, the machine might print 409; 509; or 599 pounds rather than the correct figure of 499 pounds.

The novel tilting lens assembly of the invention eliminates all possibility of errors of this character, as follows: Every time the shutter scans a nine in the unit row solenoid 38 is energized at the same time the unit "nine" is actually printed and tips the lens into the position shown in Figure 8, which causes the rays of light passing through slit 23 to be inclined upwardly, so as to throw them toward the "eight" end of the nine window. Catch 45 holds the lens in this position during the remainder of the cycle, so that when the shutter scans the tens and hundreds, the beam of light is located a safe distance from the dangerous region between "9" and "0." When the end of the cycle is reached, the lens is automatically restored to normal position by tripper 83, as has been previously described.

The difficulty developed in the close relationship of nine-to-ten also applies in the reverse relation of ten-to-nine. Accordingly, if the machine scans the "zero" units, solenoid 37 is energized at the time the zero is printed, which tilts the lens into the position shown in Fig. 7, so as to incline the rays down toward the "one" and away from the dangerous region between the zero and nine. Therefore, when the tens and hundreds are scanned, there is no possibility of the shutter picking up the wrong ray of light.

While windows 54 have been described as starting the apparatus, it should be particularly observed that by reason of the particular ratio of the window area and the area of the opaque spaces between them, it is impossible for the machine to start until the device is in substantial balance. Assume that a weight is placed on the scale and the latter starts balancing up and down, and at this instant, before the sector has come to a steady balanced position, handle 97 is pushed up to close switches 98 and 99, but the machine will not start because the alternate window and opaque space between the windows presented to the shutter slot prevents enough light strength to reach the cell for it to develop enough current in transformer 121 to start motor 73. Only when a continuous pin-hole stream of light passes through a window of the sector is the cell energized sufficiently to initiate the cycle of operations.

Although I have, by way of example, disclosed a specific embodiment of the invention, it is to be understood that the disclosure is made by way of illustration, and not limitation, the scope of the invention being indicated by the appended claims, all forms of the invention falling within the range of equivalency thereof being intended to be embraced thereby.

I claim as my invention:

1. Light sensitive apparatus comprising a movable screen having a plurality of series of windows representing different denominations graduated in accordance with its direction of movement and laterally spaced in groups, a source of light adapted to project light rays through a window of each of said series as they successively pass a predetermined zone, a photoelectric cell adapted to receive said projected rays, a rotatable shutter disposed between said screen and said photoelectric cell and operable to successively expose said cell to rays projected from one of the windows of each of said series, operating means for rotating said shutter, means controlled by said screen for starting said operating means to initiate rotation of said shutter, and means controlled by said shutter for automatically terminating the rotation thereof.

2. The apparatus defined in claim 1, wherein said shutter comprises a cylindrical shell surrounding said cell and having a helical slot coacting with the windows in said screen, to scan the exposed windows in succession upon rotation thereof.

3. The apparatus defined in claim 1, wherein said lens means is interposed between said light source and said screen, and means are provided for automatically tilting said lens means when a predetermined one of said windows is scanned by said shutter.

4. Light sensitive apparatus comprising the combination of register actuating solenoids, a plurality of light transmitting elements, a source of light positioned to project light upon said elements, a rotatable shutter for successively scanning said elements, a photoelectric cell positioned to receive light from said elements which are scanned, a commutator having a plurality of series of contacts, each series of contacts corresponding with respective series of said elements, sets of electric circuits connecting said series of contacts to said solenoids, and means for operating said commutator in timed relationship with said shutter to successively energize a contact in each series in synchronism with the scanning of corresponding elements by said shutter.

5. Light sensitive apparatus comprising a movable screen having a plurality of series of light transmitting areas grouped laterally of the direction of movement and graduated in the direction of movement of said screen and representing different denominations, a light source and a photoelectric cell located on opposite sides of said screen, a shutter between said screen and said cell and rotatable to successively allow a ray of light from one area of each series to be projected upon said cell, means for rotating said shutter, means controlled by said screen for rendering said shutter rotating means operative to initiate scanning of said screen by said shutter, and means controlled by said shutter for automatically stopping it when it has completed its scanning operation.

6. The apparatus defined in claim 5, wherein said shutter comprises a generally cylindrical shell having a helical groove therein for scanning, during each rotation thereof, the rays of light projected through said series of areas of said screen.

7. The apparatus defined in claim 5, wherein said stopping means stops said shutter after it has been rotated a full revolution.

8. Light sensitive apparatus comprising a member automatically movable in accordance with movements of a weighing device, said member having a plurality of windows, including a series of hundreds, tens and units windows, a source of light; lens means for projecting said light through said windows, photoelectric cell means adapted to receive light rays projected through said windows, shutter means for successively scanning a window of each of said series, and compensating means for automatically tilting said lens means to vary within predetermined limits the area of said member upon which said light rays will be thrown, when light rays are projected through a predetermined one of said windows.

9. The apparatus defined in claim 8, wherein said shutter means is operable to first scan the unit window, and to then scan the tens and hundreds windows, and said compensating means is operable to tilt said lens only when light rays pass through a predetermined one of said unit windows.

10. The apparatus defined in claim 8, wherein said shutter means is operable to scan the unit, tens and hundreds windows in succession, and said compensating means is operable to tilt said lens means in one direction when one predetermined unit window passes said light ray and to tilt said lens means in the opposite direction when another predetermined unit window passes said light ray.

11. The apparatus defined in claim 8, wherein said shutter means is operable to successively scan the units, tens and hundreds windows and said compensating means is operable to tilt said lens when the light passes through a predetermined unit window, and means are provided for automatically holding said lens means in tilted position while said shutter means is scanning the light projected through the tens and hundreds windows.

12. Light sensitive apparatus comprising a windowed member movable in accordance with weighing movements of a weighing device, a photoelectric cell, a light source adapted to project rays through said windows onto said cell; shutter means for successively scanning the light rays projected through said windows, light ray directing means for varying in the direction of movement of said member, the area of said member upon which the light is thrown when it passes through a predetermined one of said windows, and means for automatically restoring said light ray directing means to normal position after all the windows have been scanned.

13. The apparatus defined in claim 12, wherein said light ray directing means comprises lens means pivoted for gravitational movement into normal position and also includes latch means for moving said lens means out of normal position when light rays are projected through a predetermined unit window.

14. Light sensitive apparatus comprising a shutter movable so as to successively scan one element of a plurality of groups of elements representing different denominations, commutator means having a plurality of sets of segments corresponding to the respective elements of said groups, a solenoid for each of said segments, contact means cooperating with said commutator means and actuated in accordance with movement of said shutter for successively closing a primary circuit through said segments of each of said sets and solenoids in timed relationship to the scanning of said elements representing different denominations by said shutter, and means controlled by said shutter for successively completing secondary circuits through a single solenoid corresponding to the single element of each group as said groups are successively scanned by said shutter.

15. The apparatus defined in claim 14, wherein said shutter is mounted for rotation and said commutator and contact are mounted for relative rotation, and the speeds of rotation being so related that when the shutter makes a complete revolution said contact will make one complete pass over all of said sets of segments.

16. The apparatus defined in claim 14, wherein said shutter and said contact are mounted for synchronous rotation, so as to cause said contact to make a complete pass over said sets of segments each time said shutter makes a full revolution.

17. The apparatus defined in claim 14, wherein said commutator includes a starting segment adapted to close a circuit through a motor for actuating said shutter and contact, and means are provided for automatically stopping said motor after said shutter has completed a scanning movement.

18. The apparatus defined in claim 14, wherein said shutter and contact are mounted for synchronous rotation and are driven by an electric motor, said commutator having an additional starting contact adapted to close a circuit through said motor, and means, synchronously driven with said contact, for automatically opening said circuit and stopping said motor after a full revolution of said contact and shutter.

19. Light sensitive apparatus comprising a light source and a photoelectric cell, a windowed screen disposed between said light source and said cell, a lens disposed between said light source and said screen for normally directing light rays thereon at a predetermined angle of incidence, means mounting said lens for tilting movement, means for scanning said windows, and means, automatically operable when certain windows are scanned, for tilting said lens in one direction, for changing the angle of incidence, and also operable to tilt said lens in the opposite direction when certain other windows are scanned.

20. The apparatus defined in claim 19, wherein means are provided for automatically maintaining said lens in tilted position until the scanning operation is completed, and for automatically restoring said lens to normal position at the end of the scanning operation.

21. Light sensitive apparatus comprising a light source and a photoelectric cell, a screen disposed between said light source and said cell and having series of groups of windows representing hundreds, tens and units, the windows of each group being in graduated positions representing values in regular numerical order, a deflecting element disposed between said light source and said screen for normally directing light rays on said screen at a predetermined angle of incidence, means mounting said element for tilting movement, means for scanning successive windows, means automatically operable when the window at one terminal of a units group is scanned, for tilting said element to change the angle of incidence of the light rays in one direction, and operable when the window at the relatively opposite terminal of a units group is scanned, for tilting said element to change the angle of incidence of the light rays in the opposite direction.

22. Apparatus according to claim 21, wherein said scanning means scans first a window in the units series, then a window in each of the tens and hundreds series, and including means for maintaining said deflecting element in the position to which it has been tilted during scanning of a window of the units series until after scanning of windows of the tens and hundreds series has been completed.

23. Apparatus according to claim 21, wherein said screen is movable and provided with a row of openings spaced regularly in the direction of movement thereof and located therein to be brought into the path of said light rays, and said scanning means scans said openings, and including a motor for operating said scanning means, means operative by the passage of light rays through said openings for rendering said motor operative, and means for maintaining said motor in operating condition, after one of said openings has been scanned, to complete the scanning operation.

MANUEL MARTÍNEZ DE CASTRO.